United States Patent
Baba et al.

[11] Patent Number: 5,297,813
[45] Date of Patent: Mar. 29, 1994

[54] AIR BAG DEVICE HAVING A CONNECTING ARRANGEMENT TO FACILITATE ASSEMBLY

[75] Inventors: Yoshiyuki Baba; Yoshikazu Nakayama, both of Shiga, Japan

[73] Assignee: Takata Corporation, Tokyo, Japan

[21] Appl. No.: 968,869

[22] Filed: Nov. 2, 1992

Related U.S. Application Data

[63] Continuation-in-part of Ser. No. 688,455, Apr. 22, 1991, Pat. No. 5,167,427.

[30] Foreign Application Priority Data

Nov. 11, 1991 [JP] Japan .................. 3-294273

[51] Int. Cl.⁵ .................................... B60R 21/20
[52] U.S. Cl. ...................... 280/743 R; 280/728 R
[58] Field of Search ............... 280/728, 731, 741, 743

[56] References Cited

U.S. PATENT DOCUMENTS

| | | | |
|---|---|---|---|
| 5,074,584 | 12/1991 | Jarboe | 280/743 |
| 5,167,427 | 12/1992 | Baba | 280/728 B |

FOREIGN PATENT DOCUMENTS

| | | |
|---|---|---|
| 2192841 | 1/1988 | Japan . |
| 1-09146 | 4/1989 | Japan ..................... 280/ |
| 1-60756 | 6/1989 | Japan . |
| 1-33267 | 5/1990 | Japan . |
| 306847 | 12/1990 | Japan . |
| 2231003 | 11/1990 | United Kingdom . |
| 2236082 | 3/1991 | United Kingdom . |
| 2244961 | 12/1991 | United Kingdom . |

*Primary Examiner*—D. Glenn Dayoan
*Assistant Examiner*—Boris Milef
*Attorney, Agent, or Firm*—Kanesaka and Takeuchi

[57] ABSTRACT

An air bag device has a retainer, an air bag, a module cover and an inflator. The retainer has a flat plate portion and an erected piece projecting from the plate portion. The cover has a leg faced and fixed to the erected portion. A projection is provided at the leg which is engaged with an opening provided at the erected piece so that the module cover is held at a predetermined position during a process of fixing the leg to the erected piece.

8 Claims, 9 Drawing Sheets

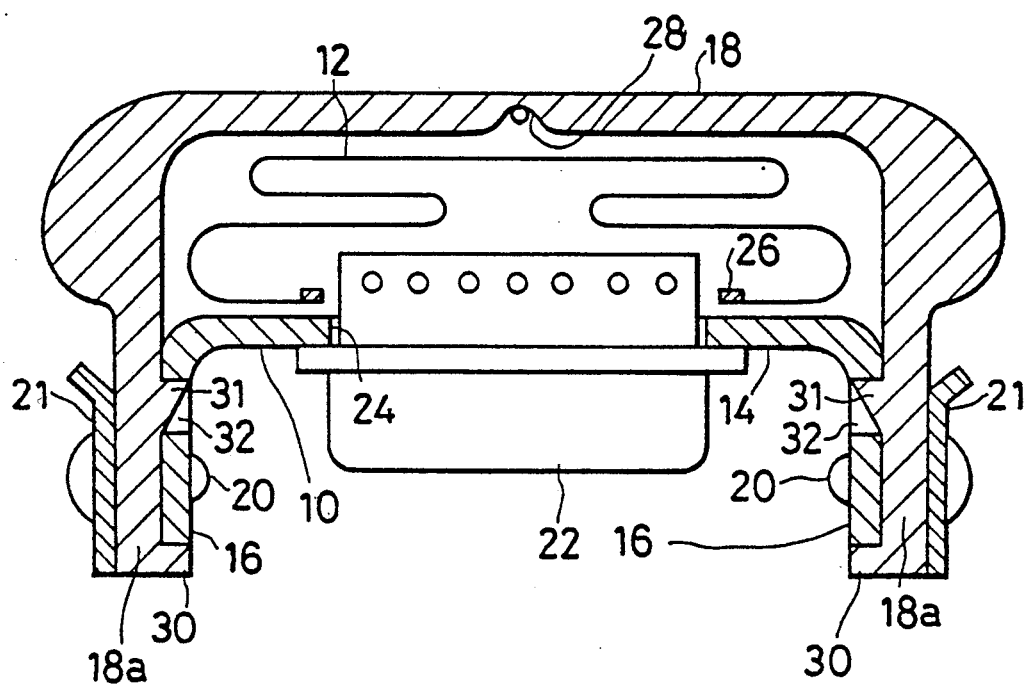
FIG.I

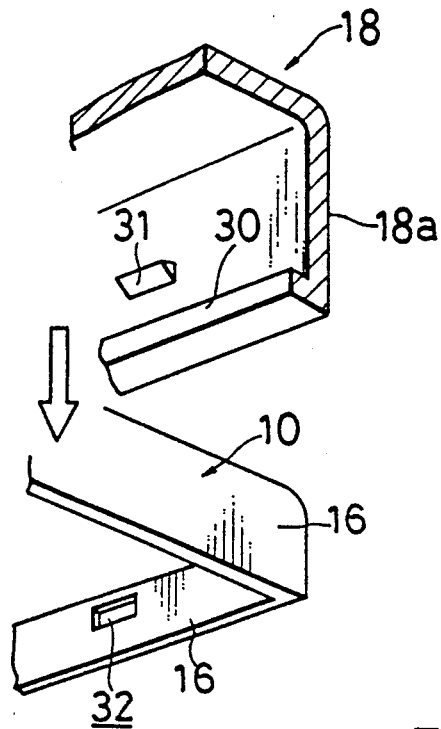
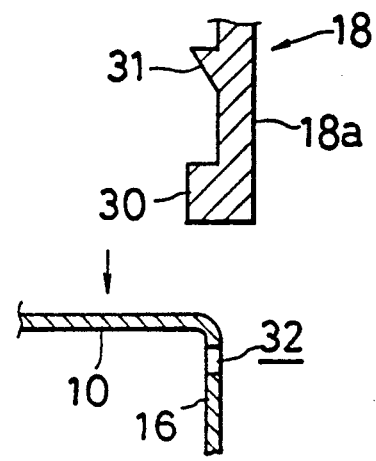
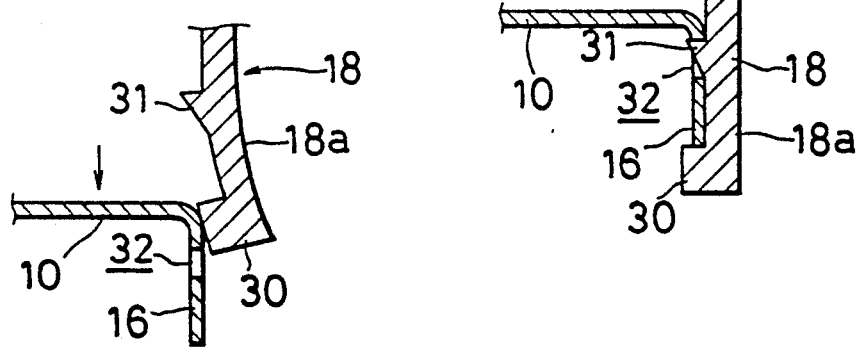
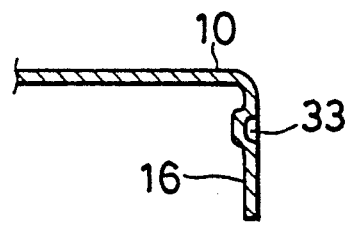

AIR BAG DEVICE HAVING A CONNECTING ARRANGEMENT TO FACILITATE ASSEMBLY

CROSS REFERENCE TO RELATED APPLICATION

This is a continuation-in-part application of patent application Ser. No. 688,455 filed on Apr. 22, 1991, now U.S. Pat. No. 5,167,427.

FIELD OF THE INVENTION AND RELATED ART STATEMENT

The present invention relates to an air bag device adapted to develop an air bag at a crash or the like of a vehicle for protecting an occupant, and particularly to an improved air bag device which allows easy assembling of a module cover covering an air bag in an assembly process.

In an air bag device, a folded air bag is attached to a mounting plate called "retainer", and is covered with a module cover. The module cover is similarly attached to the retainer, and is provided with a tear line (weak linear portion) at which tear starts when the air bag develops.

Further, an inflator is attached directly or through an appropriate mounting member to the retainer. The inflator is adapted to discharge a gas for rapidly developing the air bag at the crash or the like of the vehicle.

Such an air bag in the prior art will be described below with reference to FIGS. 7 and 8.

In FIG. 7, a retainer 10 has a flat plate portion 14 to which an air bag 12 is attached, and a module cover mounting which is formed of an erected piece 16 projected oppositely to an occupant (i.e., oppositely to a mounting side of the air bag 12) from an edge of the flat plate portion 14. The air bag 12 is in a folded condition and is covered with a module cover 18. The module cover 18 has a leg 18a at a proximal side thereof, which is fixed to the above erected piece 16 by rivets 20. A numeral 22 indicates an inflator, which has an upper portion projected through an opening 24 formed in the flat plate portion 14 into the air bag 12, and is fixed to the retainer 10. A numeral 26 indicates an air bag mounting member or ring, which cooperates with an edge of the opening 24 in the flat plate portion 14 to pinch an open edge of the air bag 12, so as to fix the air bag 12 to the retainer 10. A numeral 28 indicates a tear line provided in the above module cover 18.

In the air bag device thus constructed, when the inflator 22 is activated due to the crash or the like of the vehicle, a large amount of gas is rapidly injected from the inflator 22 to start the development of the air bag 12. In accordance with the inflation of the air bag 12, the module cover 18 tears along the tear line 28, as shown in FIG. 8, and thus, the air bag 12 rapidly develops at the interior of the vehicle to protect an occupant.

In a manufacturing process of the prior art air bag device, the air bag 12 is fixed to the retainer 10, and then is folded to have a small volume so that the folded air bag 12 is laid on the retainer 10. Then, the module cover 18 is assembled from an upper side to accommodate the air bag 12. The module cover 18 is pushed into a position in which the leg 18a of the module cover 18 overlaps the erected piece 16 of the retainer 10. In this condition, a reinforcing member 21 is laid thereon and the module cover 18 is fixed thereto by the rivets 20.

As described above, in this assembling process, after the module cover 18 is put or assembled over the air bag 12, these are sent to a riveting step in which the leg 18a is fixed by the rivets 20 while maintaining the air bag 12 in the compacted condition. However, if one takes his or her hand from the module cover 18, the module cover 18 is floated and spaced from the retainer 10 due to a resiliency of the compacted air bag 12. Therefore, in the riveting step after the putting and covering step of the module cover, an operation for pushing the module cover 18 to cover the retainer 10 is required again, which causes a problem of low operation efficiency.

Further, there are such problems that the module cover may be dislocated and/or the whole volume becomes large during transferring from the folding step of the air bag to the riveting step.

In addition, it is not easy to fix the plate 21, the cover 18 and the retainer 10 with the rivets 20 since the plate 21 often gets out of position during riveting.

OBJECT AND SUMMARY OF THE INVENTION

It is an object of the invention to provide an air bag device allowing an extremely easy assembling.

It is another object of the invention to provide an air bag device having a high coupling strength between a module cover and a retainer.

An air bag device according to one aspect of the present invention comprises a retainer having a flat plate portion and an erected piece projecting oppositely to an occupant from the flat plate portion, a folded air bag fixed to the flat plate portion of the retainer, an inflator fixed to the flat plate portion for injecting air bag development gas, a module cover covering the air bag and having a leg which is faced and fixed to the erected piece, a fixer for fixing the leg to the erected piece, a projection projecting from the leg and an engaging portion provided at the erected piece, whereby the projection is engaged with the engaging portion and the module cover is held at a predetermined position during a process of fixing the leg to the erected piece.

An air bag device according to another aspect of the present invention comprises a retainer having a flat plate portion and an erected piece projecting oppositely to an occupant from the flat plate portion, a folded air bag fixed to the flat plate portion of the retainer, an inflator fixed to the flat plate portion for injecting air bag development gas, a module cover covering the air bag and having a leg which is faced and fixed to the erected piece, a plate covering the leg at an opposite side to the erected piece, a fixer for fixing the plate and the leg to the erected piece, a projection projecting from one of the leg and the plate, and an engaging portion provided at the other of the plate and the leg, whereby the projection is engaged with the engaging portion and the module cover is held at a predetermined position during a process of fixing the leg and the plate to the erected piece.

In the air bag device thus constructed of the invention, when the module cover is put to cover the air bag after folding, the projection engages with the hollow portion or the opening, so that the module cover will not be dislocated from the retainer even if one releases his or her hold of the module cover.

BRIEF DESCRIPTION OF THE DRAWINGS

FIG. 1 is a longitudinal section illustrating an embodiment of the invention;

FIGS. 2A, 2B, 2C and 2D are views for illustrating an assembling process thereof;

FIG. 3 is a sectional view of a leg according to an another embodiment;

DESCRIPTION OF THE PREFERRED EMBODIMENTS

Figure 4:
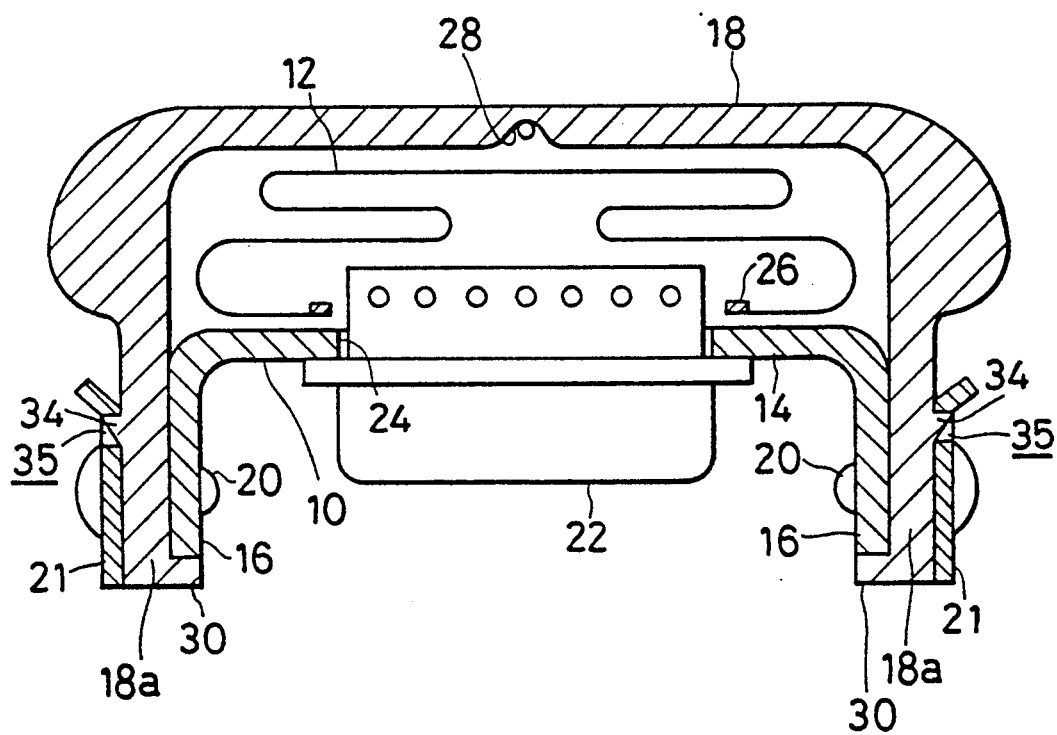
FIG. 4 is a sectional view showing a still another embodiment.

Embodiments will be described below with reference to the drawings.

FIG. 1 is a longitudinal section of an air bag device according to an embodiment of the present invention, and FIGS. 2A, 2B, 2C and 2D are views for illustrating an assembling process thereof. In this embodiment, a module cover 18 has a leg 18a which is provided at its end with a hook 30 forming an engagement portion. This hook 30 protrudes towards an interior of the module cover 18, and is engageable with an end surface of an erected piece 16 of a retainer 10. The leg 18a has projections 31 projecting from a surface thereof which is made contact with the erected piece 16. The erected piece 16 has openings 32 with which the projections 31 are engaged.

As shown in FIGS. 2A-2D, when the module cover 18 is put over the retainer 10, the leg 18a elastically deforms outward, as shown in FIG. 2C, and slides along the erected piece 16. The hook 30 ultimately engages with the end of the erected piece 16 and each of the projections 31 engages with the each opening 32, as shown in FIG. 2D and FIG. 1.

After the hook 30 engages with the end of the erected piece 16 and the projection 31 engages with the opening 32, the module cover 18 will not be dislocated from the retainer 10 even if the folded air bag 12 biases the module cover 18 upward. Therefore, in a folding step of the air bag 12, the module cover 18 which is put over the retainer 10 is not dislocated from the retainer 10 even if the module cover 18 is not yet fixed by the rivets 20. Consequently, dislocation of the module cover 18 can be completely prevented during transfer thereof from the folding step of the air bag 12 to the riveting step, and further, the whole air bag device is transferred to the riveting step while maintaining compact configurations. In the riveting step, it is not necessary to push the module cover 18 again, and the whole air bag device can be set in a riveting apparatus for fastening with the rivets 20 as it is, so that the riveting efficiency can be extremely increased.

In the present invention, a hollow portion 33 may be provided at the erected piece 16 as shown in FIG. 3 instead of the opening 32.

Figure 5:
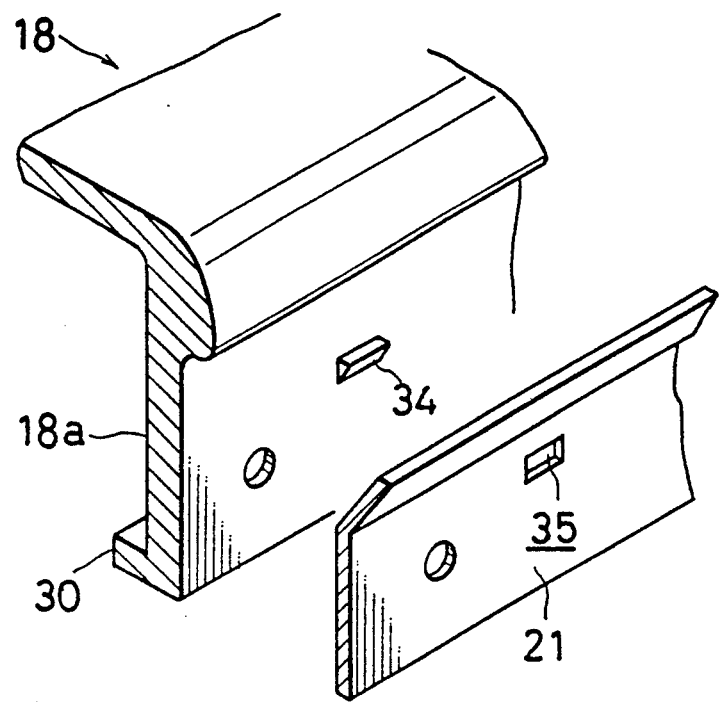
FIG. 5 is a view for illustrating an assembling process of another embodiment.

FIG. 4 is a sectional view for illustrating another embodiment of the invention, and FIG. 5 is a view for illustrating an assembling process of a main portion of an air bag device according to this embodiment. In this embodiment, the leg 18a has projections 34 projecting from a surface thereof which is made contact with the plate 21. Openings 35 are provided at the plate 21 which are engaged with the projections.

In this embodiment of FIGS. 4 and 5, riveting efficiency is extremely increased since the plate 21 is fixed by engaging each of the projection 34 with each opening 35 during riveting. As also in this embodiment, the module cover 18 is prevented from being dislocated from the retainer 10 since the leg 18a has the hook 30.

Figure 6:
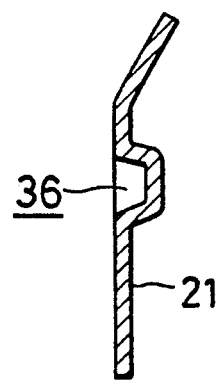
FIG. 6 is a sectional view of a plate according to a still another embodiment.
Figure 7:
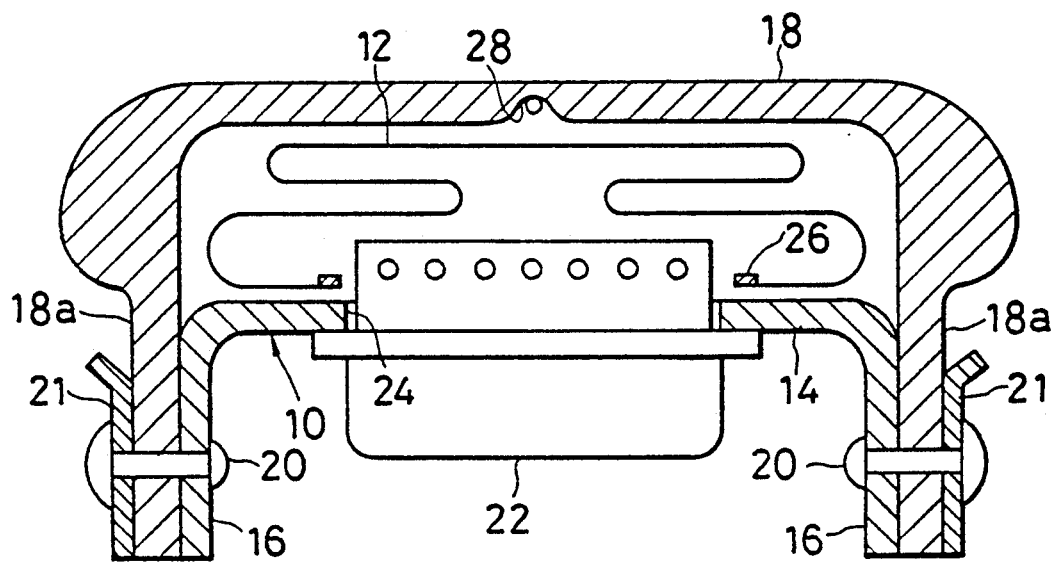
FIG. 7 is a cross section illustrating a prior art.
Figure 8:
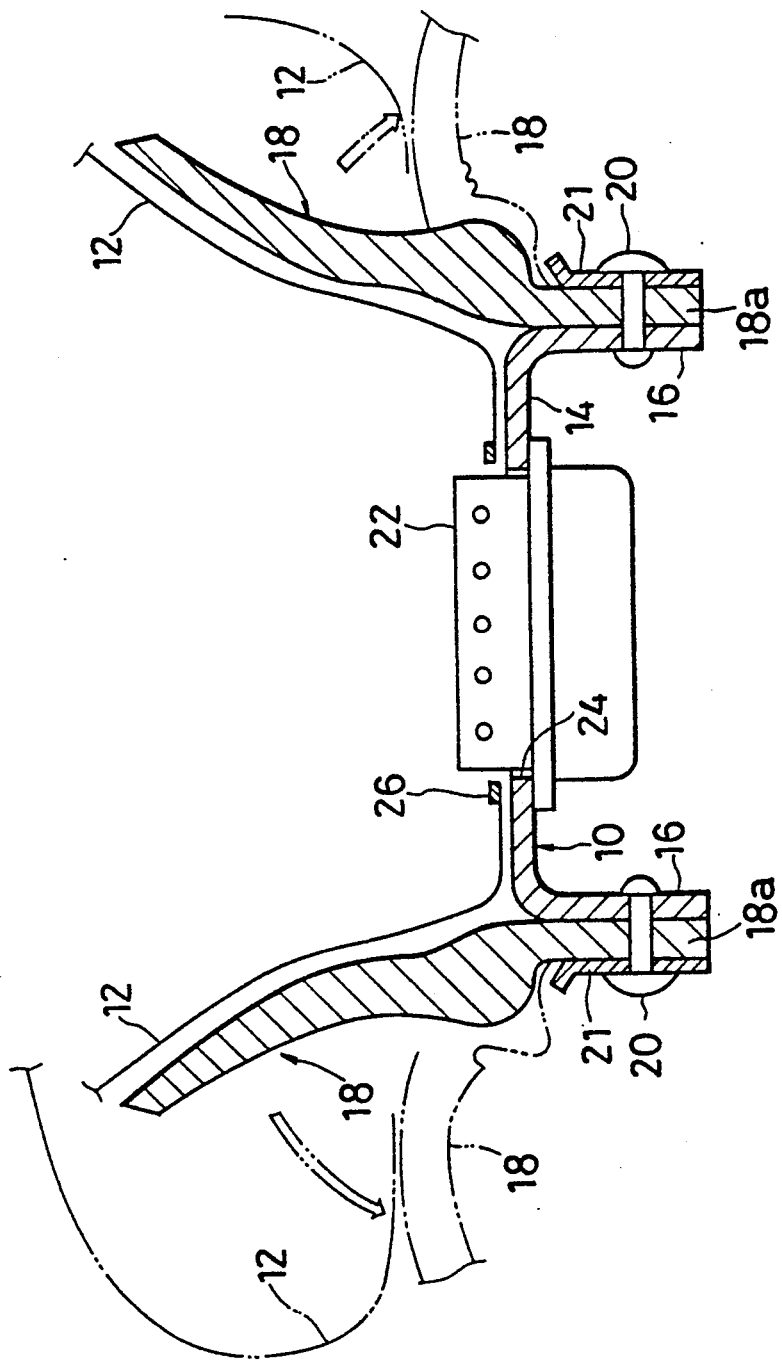
FIG. 8 is a cross section of an air bag of a prior art when operating.
Figure 9A:
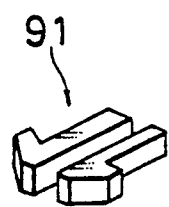
FIGS. 9A and 9B are perspective views of projections 91 and 92.
Figure 9B:
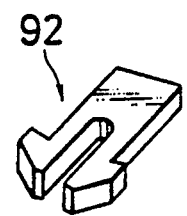

In the present invention, a hollow portion 36 may be provided at the plate 21 instead of the opening 36 as shown in FIG. 6. Furthermore, a projection may be provided at the plate 21 and an opening or a hollow portion may be provided at the leg 18a as opposed to the embodiment of FIGS. 4 and 5.

Figure 16:
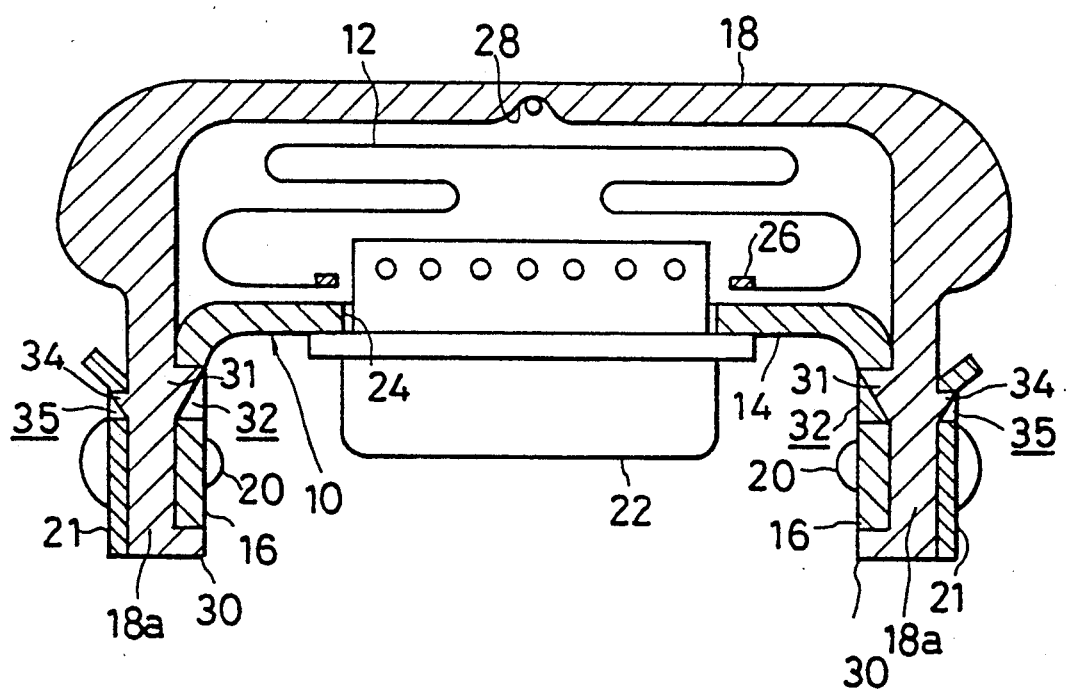
FIG. 16 is a sectional view of an air bag device according to a still another embodiment.

In the present invention, the leg 18a can have both of projections 31 and 34 as shown in FIG. 16.

Although the above projections 31 and 34 have a triangular pillar shape, they may have another shape such as a circular column shape, quadrilateral column shape or cubic shape.

FIGS. 9 to 13 show other projections in various shape. Projections 91, 92 shown in FIGS. 9A to 9B have slits at a top thereof and side portions projecting sidewards from the top. The side portions are brought closer to each other when they are inserted into an opening, and separated from each other after they have passed therethrough and engaged with an edge of the opening. The projection 91 has the slit elongated from the top toward the rear end thereof. The projection 92 has the slit which is elongated from the top to the middle portion thereof.

Figure 10:
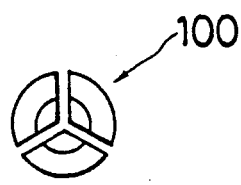
FIG. 10 is a front view of a projection 100.

FIG. 10 is a front view of a projection 100 which has, at the top thereof, three tips separated from each other. Slits between the tips may extend from the top to a rear portion or a middle portion of the projection.

Figure 11A:
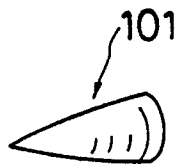
FIGS. 11A and 11B are perspective views of projections 101 and 102.
Figure 11B:
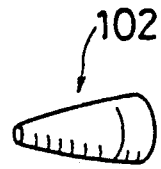
Figure 12A:
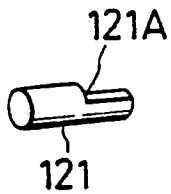
FIGS. 12A, 12B, 12C, 12D, 12E and 12F are perspective views of projections 121 to 126.
Figure 12B:
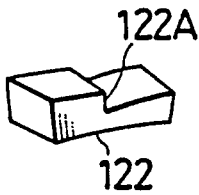
Figure 12C:
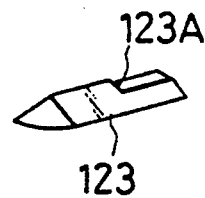
Figure 12D:
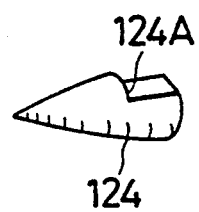
Figure 12E:
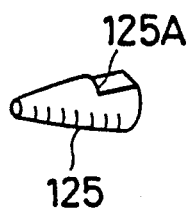
Figure 12F:
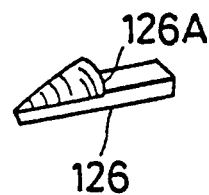

FIGS. 11A and 11B show projections having a shape similar to an artillery shell.

FIGS. 12A-12F are perspective views of projections 121, 122, 123, 124, 125, 126 which have step portions 121A, 122A, 123A, 124A, 125A, 126A in each middle position in a longitudinal direction thereof. Each of the projections 121 to 126 is inserted into an opening and prevented from getting out therethrough on engagement of the step portion and an edge of the opening.

Figure 13A:
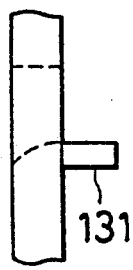
FIGS. 13A, 13B and 13C are side views of projections 131, 132 and 133.
Figure 13B:
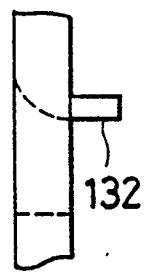
Figure 13C:
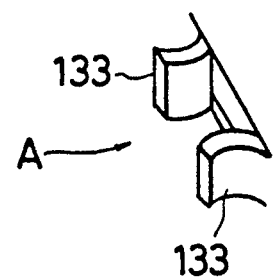
Figure 14:
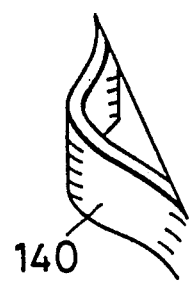
FIG. 14 is a perspective view of a projection 140.
Figure 15A:
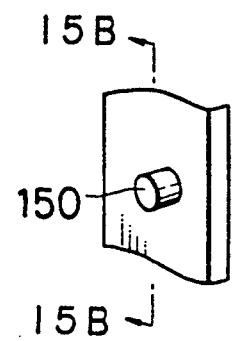
FIG. 15A is a perspective view of a projection 150.
Figure 15B:
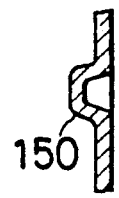
FIG. 15B is a sectional view taken along a B—B line in FIG. 15A.

In the present invention, a projection may be formed by bending tongues as such projections 131, 132, 133 shown in FIGS. 13A, 13B and 13C. A projection 140 shown in FIG. 14 may be applied, which is bent out through a pair of parallel slits. A projection 150 shown in FIG. 15A may also be applied, which is stamped out from the plate. FIG. 15B is a sectional view taken along a 15B—15B line in FIG. 15A.

According to the air bag device of the invention, as described hereinabove, since the module cover is temporarily fixed to the retainer in the assembling process thereof, the assembling work of the air bag device can be extremely facilitated, and thus the assembling work efficiency can be remarkably improved. Further, the engagement of the module cover with the retainer increases a coupling strength between the module cover and the retainer in the tearing operation of the module cover when the air bag device is activated.

What is claimed is:

1. An air bag device for protecting an occupant comprising:
   a retainer having a flat plate portion and an erected piece projecting oppositely to the occupant from the flat plate portion,
   a folded air bag fixed to said flat plate portion of said retainer,
   an inflator fixed to said flat plate portion for injecting an air bag development gas,
   a module cover covering said air bag and having a leg which is faced and fixed to said erected piece,
   a plate covering said leg at an opposite side to said erected piece,
   a fixer for fixing said plate and said leg to said erected piece,
   a projection projecting from one of said leg and said plate, said projection being located above a lower edge and having a slit extending rearwardly from a front end to a rear end thereof and a pair of side portions extending sidewards from a front portion thereof, and
   an engaging portion in a form of an opening provided at the other of said plate and said leg at a position above a lower edge thereof and corresponding to said projection so that said projection is engaged with said engaging portion to thereby easily hold the plate at a predetermined position during a process of fixing said leg and said plate to said erected piece.

2. An air bag device as set forth in claim 1, wherein said device further comprises a hook at an end of said leg, said hook being engaged with an end of said erected piece.

3. An air bag device for protecting an occupant comprising:
   a retainer having a flat plate portion and an erected piece projecting oppositely to the occupant from the flat plate portion,
   a folded air bag fixed to said flat plate portion of said retainer,
   an inflator fixed to said flat plate portion for injecting an air bag development gas,
   a module cover covering said air bag and having a leg which is faced and fixed to said erected piece,
   a plate covering said leg at an opposite side to said erected piece,
   a fixer for fixing said plate and said leg to said erected piece,
   a projection projecting from one of said leg and said plate, said projection being located above a lower edge and having a slit extending rearwardly from a front end to a middle portion thereof and a pair of side projections extending sidewards from a front portion thereof, and
   an engaging portion in a form of an opening provided at the other of said plate and said leg at a position above a lower edge thereof and corresponding to said projection so that said projection is engaged with said engaging portion to thereby easily hold the plate at a predetermined position during a process of fixing said leg and said plate to said erected piece.

4. An air bag device for protecting an occupant comprising:
   a retainer having a flat plate portion and an erected piece projecting oppositely to the occupant from the flat plate portion,
   a folded air bag fixed to said flat plate portion of said retainer,
   an inflator fixed to said flat plate portion for injecting an air bag development gas,
   a module cover covering said air bag and having a leg which is faced and fixed to said erected piece,
   a plate covering said leg at an opposite side to said erected piece,
   a fixer for fixing said plate and said leg to said erected piece,
   a projection projecting from one of said leg and said plate, said projection being located above a lower edge and having three slits extending rearwardly from a front end to at least a middle portion thereof to form three tips separated from each other, and
   an engaging portion in a form of an opening provided at the other of said plate and said leg at a position above a lower edge thereof and corresponding to said projection so that said projection is engaged with said engaging portion to thereby easily hold the plate at a predetermined position during a process of fixing said leg and said plate to said erected piece.

5. An air bag device for protecting an occupant comprising:
   a retainer having a flat plate portion and an erected piece projecting oppositely to the occupant from the flat plate portion,
   a folded air bag fixed to said flat plate portion of said retainer,
   an inflator fixed to said flat plate portion for injecting an air bag development gas,
   a module cover covering said air bag and having a leg which is faced and fixed to said erected piece,
   a plate covering said leg at an opposite side to said erected piece,
   a fixer for fixing said plate and said leg to said erected piece,
   a projection projecting from one of said leg and said plate, said projection being located above a lower edge and having a corn shape, and
   an engaging portion provided at the other of said plate and said leg at a position above a lower edge thereof and corresponding to said projection so that said projection is engaged with said engaging portion to thereby easily hold the plate at a predetermined position during a process of fixing said leg and said plate to said erected piece.

6. An air bag device for protecting an occupant comprising:
   a retainer having a flat plate portion and an erected piece projecting oppositely to the occupant from the flat plate portion,
   a folded air bag fixed to said flat plate portion of said retainer,
   an inflator fixed to said flat plate portion for injecting an air bag development gas,
   a module cover covering said air bag and having a leg which is faced and fixed to said erected piece,
   a plate covering said leg at an opposite side to said erected piece,
   a fixer for fixing said plate and said leg to said erected piece, a projection projecting from one of said leg and said plate, said projection being located above a lower edge and having a truncated corn shape, and an engaging portion provided at the other of said plate and said leg at a position above a lower edge thereof and corresponding to said projection so that said projection is engaged with said engaging portion to thereby easily hold the plate at a predetermined position during a process of fixing said leg and said plate to said erected piece.

7. An air bag device for protecting an occupant comprising:

a retainer having a flat plate portion and an erected piece projecting oppositely to the occupant from the flat plate portion, a folded air bag fixed to said flat plate portion of said retainer, an inflator fixed to said flat plate portion for injecting an air bag development gas, a module cover covering said air bag and having a leg which is faced and fixed to said erected piece, a plate covering said leg at an opposite side to said erected piece, a fixer for fixing said plate and said leg to said erected piece, a projection projecting from one of said leg and said plate, said projection being located above a lower edge and having a step portion in a middle position in a longitudinal direction thereof, and an engaging portion in a form of an opening provided at the other of said plate and said leg at a position above a lower edge thereof and corresponding to said projection so that said projection is engaged with said engaging portion to thereby easily hold the plate at a predetermined position during a process of fixing said leg and said plate to said erected piece, said step portion preventing said projection from being disengaged from said engaging portion.

8. An air bag device for protecting an occupant comprising:

a retainer having a flat plate portion and an erected piece projecting oppositely to the occupant from the flat plate portion, a folded air bag fixed to said flat plate portion of said retainer, an inflator fixed to said flat plate portion for injecting an air bag development gas, a module cover covering said air bag and having a leg which is faced and fixed to said erected piece, a plate covering said leg at an opposite side to said erected piece, a fixer for fixing said plate and said leg to said erected piece, a projection projecting from one of said leg and said plate, said projection being an outwardly curved strip of a plate defined by a pair of parallel slits and being located above a lower edge, and an engaging portion provided at the other of said plate and said leg at a position above a lower edge thereof and corresponding to said projection so that said projection is engaged with said engaging portion to thereby easily hold the plate at a predetermined position during a process of fixing said leg and said plate to said erected piece.

* * * * *